US011190475B2

United States Patent
Finch

(10) Patent No.: US 11,190,475 B2
(45) Date of Patent: Nov. 30, 2021

(54) SYSTEM AND METHOD FOR PROVIDING A VIDEO MESSAGING SERVICE

(71) Applicants: Michael Finch, Watford (GB); Stephen Kendall-Lane, London (GB)

(72) Inventor: Michael Finch, Watford (GB)

(73) Assignee: Kendall-Lane Stephen, London (GB)

( * ) Notice: Subject to any disclaimer, the term of this patent is extended or adjusted under 35 U.S.C. 154(b) by 0 days.

(21) Appl. No.: 16/646,003

(22) PCT Filed: Feb. 28, 2018

(86) PCT No.: PCT/GB2018/050513
§ 371 (c)(1),
(2) Date: Mar. 10, 2020

(87) PCT Pub. No.: WO2019/077294
PCT Pub. Date: Apr. 25, 2019

(65) Prior Publication Data
US 2020/0213259 A1    Jul. 2, 2020

(30) Foreign Application Priority Data

Oct. 16, 2017 (GB) ..................... 1716990

(51) Int. Cl.
*H04L 12/58* (2006.01)
*H04L 29/08* (2006.01)
(Continued)

(52) U.S. Cl.
CPC .......... *H04L 51/18* (2013.01); *G06F 16/2365* (2019.01); *H04L 51/06* (2013.01);
(Continued)

(58) Field of Classification Search
CPC ....... H04L 51/38; H04L 51/046; H04L 51/18; G11B 27/105; G11B 27/11; G11B 27/34;
(Continued)

(56) References Cited

U.S. PATENT DOCUMENTS

| 7,903,794 B1 | 3/2011 | Bales et al. |
| 2007/0043823 A1 | 2/2007 | George et al. |

(Continued)

OTHER PUBLICATIONS

Oteo Mayayo, Carlota; International Search Report; PCT/GB2018/050513; dated Jul. 11, 2018; 3 pages.

*Primary Examiner* — Kyung H Shin
(74) *Attorney, Agent, or Firm* — Lando & Anastasi, LLP

(57) ABSTRACT

A method is presented for providing a video messaging service to one or more mobile user device(s) in a wireless telecommunication network. The method of the present invention comprises the steps of (a) receiving and storing, at a predetermined media storage, at least one media content file; (b) generating at least one metafile associated with said at least one media content file, said metafile comprising at least (i) a first Uniform Resource Locator (URL) of said at least one media content file and (ii) one or more first autonomously actionable instructions, adapted to effect the transfer of said at least one media content file from said predetermined media storage to said one or more mobile user device(s); (c) transmitting, via push technology, said at least one metafile to said one or more mobile user device(s), utilising a third party messaging service; (d) responsive to said one or more first autonomously actionable instructions, downloading, via pull technology, said at least one media content file from said predetermined media storage to said one or more mobile user device(s); (e) responsive to completing the download of said at least one media content file, notifying the availability of said at least one video content file at said one or more mobile user device, and (f) responsive to a predetermined user input, accessing said at least one media content file utilising a media player application provided on said one or more mobile user device(s).

20 Claims, 8 Drawing Sheets

(51) Int. Cl.
*G06F 16/23* (2019.01)
*H04N 21/845* (2011.01)

(52) U.S. Cl.
CPC .............. *H04L 51/10* (2013.01); *H04L 51/22* (2013.01); *H04L 51/38* (2013.01); *H04L 67/26* (2013.01); *H04N 21/8456* (2013.01)

(58) Field of Classification Search
CPC ......... H04N 21/8456; H04N 21/45457; H04N 21/47217; H04N 21/4821; H04N 21/4532; G06F 16/2365; G06F 16/44; G06F 16/9574
See application file for complete search history.

(56) References Cited

U.S. PATENT DOCUMENTS

| | | | |
|---|---|---|---|
| 2009/0024925 A1* | 1/2009 | Stevens | G11B 27/105 |
| | | | 715/716 |
| 2010/0131895 A1 | 5/2010 | Wohlert | |
| 2010/0273450 A1 | 10/2010 | Papineau et al. | |
| 2013/0144974 A1 | 6/2013 | Haakenson et al. | |
| 2015/0326727 A1 | 11/2015 | Desai et al. | |
| 2015/0358262 A1* | 12/2015 | Cronin | H04L 51/38 |
| | | | 709/206 |
| 2016/0028840 A1 | 1/2016 | Krishnan et al. | |
| 2016/0323218 A1 | 11/2016 | Sadanandan et al. | |
| 2017/0366859 A1* | 12/2017 | Chimayan | H04N 21/8456 |
| 2018/0052881 A1* | 2/2018 | Arumugham | G06F 16/2365 |

* cited by examiner

```
<VPP>
    <HDR ver="1" date="10/10/16" fsize="22113210" descr="Cheltenham3"
baseurl="http://www.amof.co.uk/content/cheltenham3/"   />
    <PARAMS  totdur="443" msgfbopts="web viewed received" />
    <MEDIA vidsrc="cheltenham3.mp4" imgsrc="jockey_club4.jpg"
txtsrc="cheltenham3.txt" thumb ="cheltenham3_tn.jpg"/>
    <OPTIONS  clpid="cheltentam3"  searchterms="Cheltenham festival
racecourse jockey club"  searchsites="google,yahoo" />
    <CUSTMENU id="0" label="The Cheltenham Collection"
srvno="http://cheltenham.thejockeyclub.co.uk/cheltenham-collection"
fbopt="3" />
    <BUTTON  label = "The Cheltenham Collection" />
    <CUSTMENU id="1" btnimg="jockeyclub2_btn.jpg" btntxt="Jockey Club"
label="The Cheltenham Collection"
srvno="http://cheltenham.thejockeyclub.co.uk/cheltenham-collection"
fbopt="3" />
    <CUSTMENU id="2"  btnimg="londonfashionweek_btn.jpg" label="London
Fashion Week" clipid="londonfashionweek" fbopt="4" />
    <CUSTMENU id="3"  btnimg="betfred2_btn.jpg" label="Bet with
Betfred" srvno="http://www.betfred.com/ " fbopt="3" />
</VPP>
```

Notes:

```
<HDR>
fsize      = size of main video file in bytes
baseurl    = base URL of content for this message. Actual urls for media
             content are then formed using url = baseurl+media_file_name
<MEDIA>    specifies the media to be used in this message.
           The URL to download each media element is formed as  baseurl
           + vidsrc   etc
<CUSTMENU> defines the custom menu options
           btnimg = the button graphic
           btntxt = text displayed on the custom button
           srvno  = URL linked-to. Will launch the default browser with
                    this URL
           clipid = specifies that a querystring in the form
                    ?clipid="value" be appended to the URL(there are many
                    other similar query string responses we can generate)
```

Query STRING http://www.musicwebsite.com/homepage.html?{age}{musical_preferences}

Here, the quantities in brackets {age}{musical_preferences} and potentially other quantities, are substituted by values stored by the app on a particular user's handset.

*FIG. 8*

SYSTEM AND METHOD FOR PROVIDING A VIDEO MESSAGING SERVICE

The present invention relates generally to the field of telecommunications such as wireless telecommunication. In particular, the present invention relates to media messaging services, more specifically, to a method and system for providing media messages to mobile user devices, as well as, generating a dynamically adapted media player user interface on a mobile user interface.

INTRODUCTION

In the past decade, digital technologies have had a massive impact on both consumers and companies. The impact has been particularly significant in the media industry, as consumers gravitate more toward mobile digital devices to access communicate and/or access content. Also, the proliferation of high-speed networks has led to more people consuming and/or communicating video content on their mobile devices. This change has led to the development of various messaging services and other value added services by telecommunication providers and application developers.

As mobile devices become more powerful, messaging services such as MMS (Media Messaging Service) have become increasingly popular because it allows a user-friendly transfer of multimedia content (e.g. audio, video, text, still images, or animation etc.) to and from mobile user devices. Typically, data is transferred to and from mobile devices via a wireless network, such as, for example, a mobile/cellular network or a wireless local area network (Wi-Fi), and considerable charges may be incurred by the user when sending or receiving data, especially when sending/receiving large media files, such as, for example, video clips, or when downloading large data files required to generate a suitable media player on the user device.

In addition, many MMS service providers impose a restriction on the maximum file size that can be sent or received, so that, when a user wants to transfer a larger media file, a link (URL) to a website may has to be send/received instead. The receiving user must then stream or download the media content from a server to the user device.

What is more, digital services have become a legitimate mobile marketing tool that is capable of reaching a consumer in many parts of the world, for example, by sending advertisement using images, animations or even video clips to specific mobile user devices (e.g. smart phone, tablet). Such mobile marketing can provide potential customers with time- and/or location-sensitive and personalised information, so as to promote specific good and services. Moreover, mobile marketing is increasingly taking advantage of software applications, such as, for example, smartphone apps, as a marketing and advertising resource, because it can provide a greatly improved interaction between a service/goods provider and its target customer.

However, sending marketing media files to potential customers via mobile networks can incur significant costs to the marketer, i.e. the cost for using MMS messaging as an advertisement-driven service are likely to be high, even when heavily-discounted bulk messaging rates are applied.

Consequently, there is a need for a viable, efficient and cost effective media messaging service that is capable of transferring, for example, any sized video message to and from a mobile device. Furthermore, there is a need for a system and media messaging platform that is capable of providing improved and customised functionality to the user, as well as, the service provider, by allowing tailored and dynamic media content, advertisements and/or user interfaces to be utilised on a user device.

SUMMARY OF THE INVENTION

Preferred embodiment(s) of the invention seek to overcome one or more of the above disadvantages of the prior art.

According to a first aspect of the invention, there is provided a method for providing a video messaging service to one or more mobile user device(s) in a wireless telecommunication network, comprising the steps of:

(a) receiving and storing, at a predetermined media storage, at least one media content file;

(b) generating at least one metafile associated with said at least one media content file, said metafile comprising at least (i) a first Uniform Resource Locator (URL) of said at least one media content file and (ii) one or more first autonomously actionable instructions, adapted to effect the transfer of said at least one media content file from said predetermined media storage to said one or more mobile user device(s);

(c) transmitting, via push technology, said at least one metafile to said one or more mobile user device(s), utilising a third party messaging service;

(d) responsive to said one or more first autonomously actionable instructions, downloading, via pull technology, said at least one media content file from said predetermined media storage to said one or more mobile user device(s);

(e) responsive to completing the download of said at least one media content file, notifying the availability of said at least one video content file at said one or more mobile user device, and (f) responsive to a predetermined user input, accessing said at least one media content file utilising a media player application provided on said one or more mobile user device(s).

This provides the advantage that, for example, a "true" video message can be sent directly to a mobile user device, and the received video message will be complete and ready to play in its entirety as soon as a notification is received at the mobile user device. In particular, after the metafile (instruction file) is pushed to the mobile user device via the third party messaging service (e.g. via the "free of charge" Google Cloud Messenger), the media file is downloaded in "the background" without the application being visible on-screen, and only when all required data is downloaded to the mobile user device, is the user notified of its existence. The media elements provided in the metafile are not compiled and exist as individual data files that can be placed on any standard web server. Also, there is no file size limit to the actual media content file that is subsequently transferred to the mobile user device. In view of the commercial implications (e.g. server-to-client application), messages can be sent at close to no cost to the sender, therefore making a "free-to-user" advertiser-funded service financially viable. Alternatively, the invention allows the method to be used as a peer-to-peer media messaging service, where one end user may forward message(s) to another end user.

Advantageously, steps (a), (b), (c), (d), (e) and (f) may be executed in a sequential order. Preferably, said at least one metafile may further comprise one or more second autonomously actionable instructions adapted to effect the creation of a dynamically adaptable media player interface of said media player application provided on said one or more mobile user device(s). Alternatively, said at least one metafile may further comprise one or more third autonomously actionable instructions adapted to dynamically modify one or more interface characteristics of said media player application provided on said one or more mobile user device(s). Preferably, said at least one media content file may comprise any one of at least one video file, one or more Graphical User Interface (GUI) element(s), and one or more CTA (Call To Action) functionality element(s) adapted to link to and/or launch external media content.

This provides the advantage that a dynamically adaptable user interface can be generated on the mobile user device "on the fly", therefore, providing media content (e.g. video), as well as, a user interface with enhanced functionality and that can be "tailored" (adapted) to any specific needs of a user. For example, menu options of the media player may be configured differently depending on whether the video is currently playing or stopped, or whether the video was viewed to the end, or according to the date or time that has elapsed since the media file was received. So, upon reception of the metafile, the mobile user device's software application (e.g. installed App, or generated/modified media player) would decide what type of interface and content is most favourable according to a selected criterion.

Advantageously, any one of said at least one video file, said one or more Graphical User Interface (GUI) element(s), and said one or more CTA functionality element(s) may be selected according to profile data provided by the user, said profile data comprising one or more user profile parameter(s). Preferably, said profile data may comprise predetermined user profile information and/or predetermined user preferences. Even more preferably, said at least one media content file may further comprise at least one second URL operably linked with said one or more CTA functionality element(s). Additionally, said at least one second URL may comprise a query string generated from said one or more user profile parameter(s).

This provides the advantage that the media content can be tailored to specific user characteristics or preferences provided by the user.

Advantageously, said at least one metafile may further comprise metadata associated with said at least one media content file.

Advantageously, said metafile may be provided in Extensible Markup Language (XML) format of a file size that is less than or equal to a predetermined file size limit. Preferably, said file size limit may be four kilobytes (kB).

Additionally and advantageously, any one of steps (d), (e) and (f) may further comprise the step of generating feedback data and transmitting, via push technology, said feedback data utilising said third party messaging service. Preferably, said feedback data may be transmitted, via push technology, utilising said third party messaging service and/or a Hypertext Transfer Protocol (HTTP). Even more preferably, said feedback data may comprise user behaviour detected in regard to interacting with said media player application and/or said at least one media content file. Advantageously, said feedback data may be operably linked to said one or more CTA functionality element(s).

This provides the advantage of providing user characteristics to the service provider, therefore, allowing the service provider to customise specific service to the user even more accurately.

Advantageously, the execution of step (d) may be subject to a predetermined first condition. Preferably, said predetermined first condition may be that said wireless telecommunication network is not a cellular telephone network. Even more preferably, said predetermined first condition may be that said wireless telecommunication network is a wireless local area network (WiFi).

This provides the advantage that potential costs for data transfer to the mobile user device are minimised.

Advantageously, step (d) may further include the step of determining an integrity characteristic of said downloaded at least one media content file and, subject to at least one second condition, repeat the step of downloading, via pull technology, said at least one media content file from said predetermined media storage to said one or more mobile user device(s). Preferably, said at least one second condition may be that said determined integrity characteristic of said downloaded at least one media content file matches a threshold value provided in said at least one metafile. Even more preferably, said integrity characteristic of said at least one media content file may be determined utilising a checksum function.

Advantageously, said third party messaging service may be a cloud based messaging service.

According to a second aspect of the present invention, there is provided a video messaging system, comprising a software application, at least one mobile user device for operating said software application, a media storage and delivery platform, a wireless telecommunication network, and at least one third party messaging service platform, and wherein said video messaging system is adapted to execute the method of the first aspect of the invention.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure. Thus, preferred embodiments of the present invention will be described, by way of example only and not in any limitative sense, with reference to the accompanying drawings, in which:

FIG. 8 shows an example metafile.

DETAILED DESCRIPTION OF THE PREFERRED EMBODIMENT(S)

The exemplary embodiments of this invention will be described in relation to a video messaging service (serverto-client application) provided to one or more mobile end-user devices via a wireless network. However, it should be appreciated by the person skilled in the art that the invention may also be used for any other media type and in a peer-to-peer application arrangement.

For purposes of explanation, it should be appreciated that the terms 'determine', 'calculate' and 'compute', and variations thereof, as used herein are used interchangeably and include any type of methodology, process, mathematical operation or technique. The terms 'generating' and 'adapting' are also used interchangeably describing any type of data or signal processing for manipulating analogue and digital media data (e.g. audio, video). The term 'content' or 'media content' is understood to include audio, text, graphics, video, images, animation and other possible forms of media. Also, the terms 'App' and 'software application' are used interchangeably describing a computer program or a piece of software designed for a particular purpose and which can be downloaded onto a mobile user device. Well-known technology or methods have not been described in detail to avoid obscuring the present invention. As such, specific structural and functional details disclosed herein are not to be interpreted as limiting features, but simply as a basis for the claims and for teaching one skilled in the art.

Figure 1:
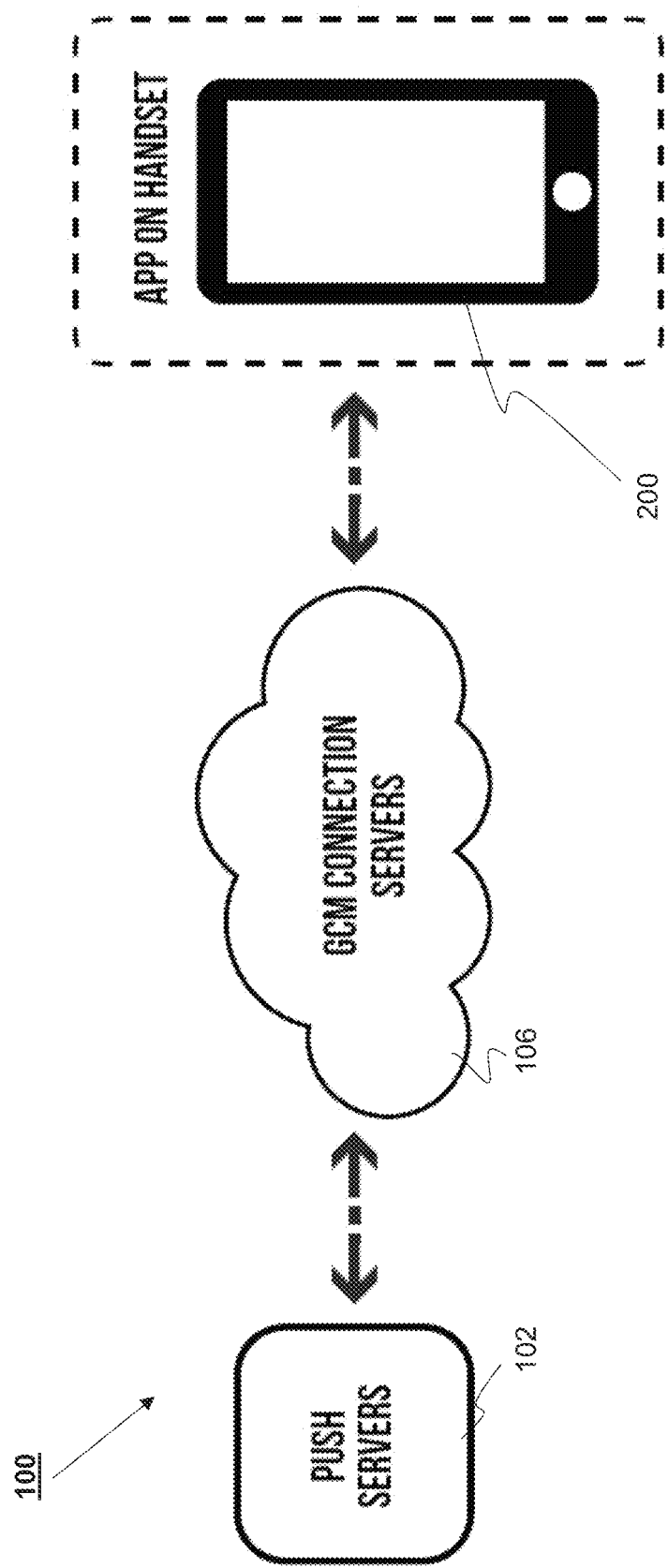
FIG. 1 shows a simplified illustration of the basic system architecture of the video messaging service.
Figure 2:
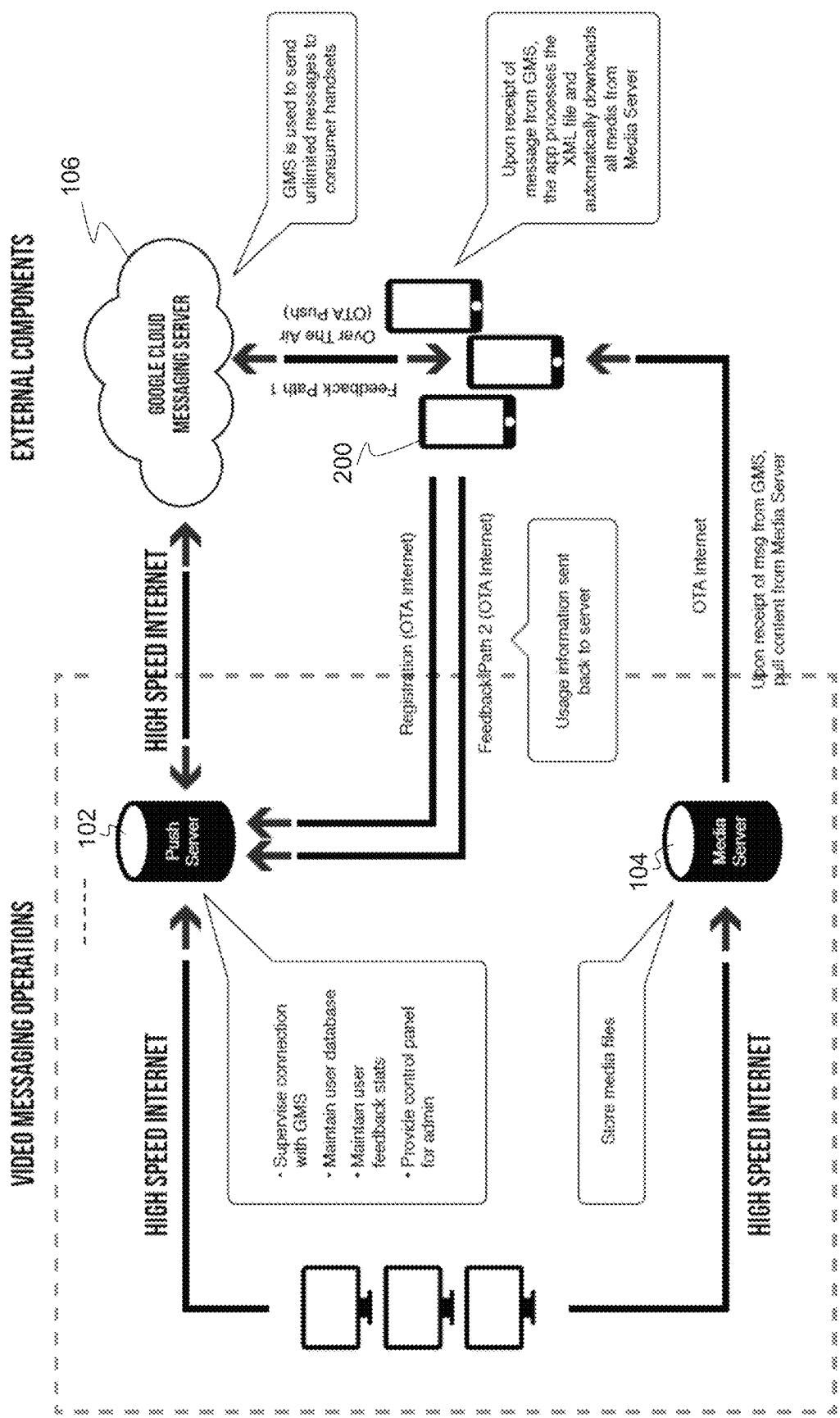
FIG. 2 shows a simplified schematic of the detailed system architecture of the video messaging service, including operations between system components.
Figure 3:
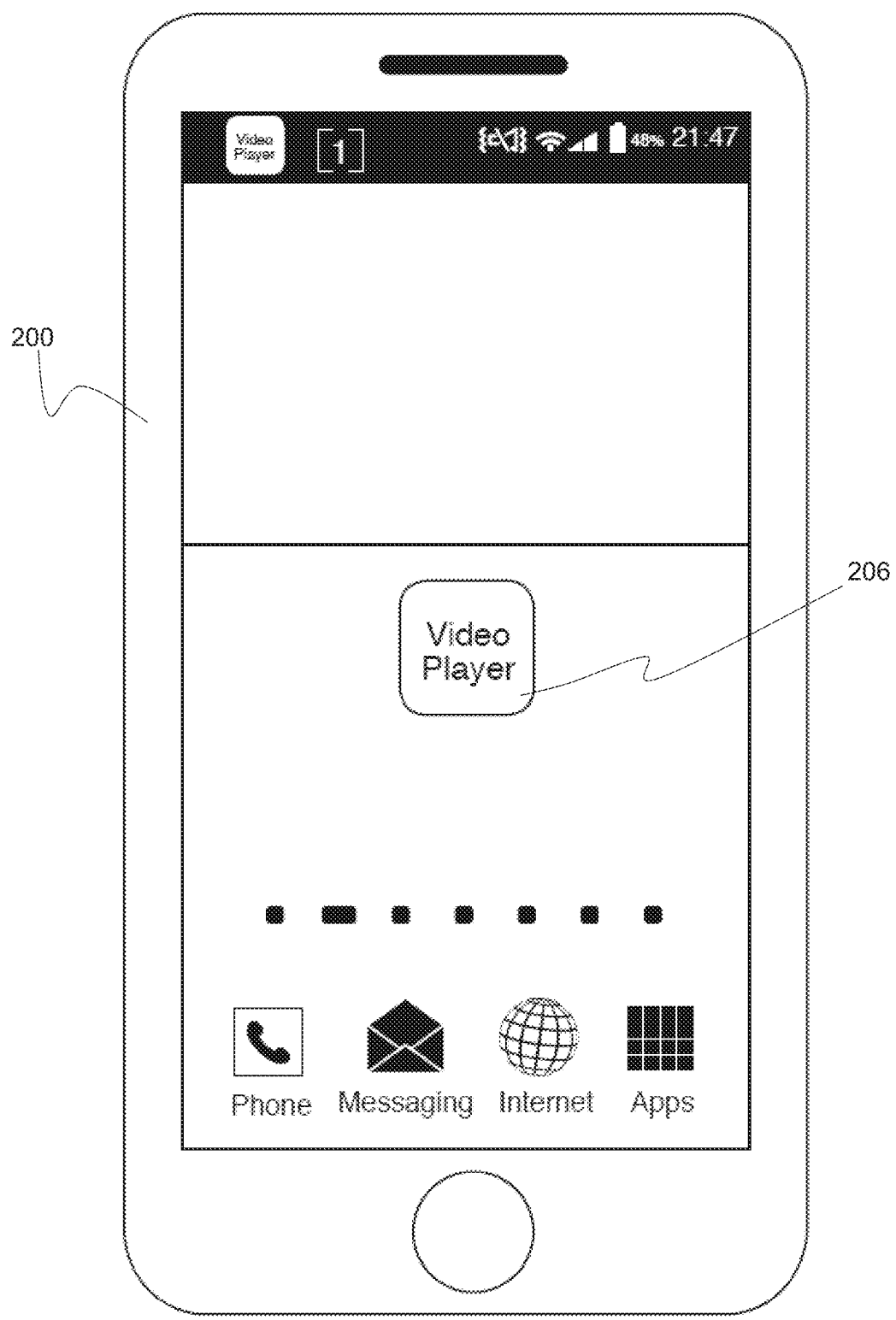
FIG. 3 shows an illustration of a mobile user device and App interface indicating the arrival of a new video message.
Figure 4:
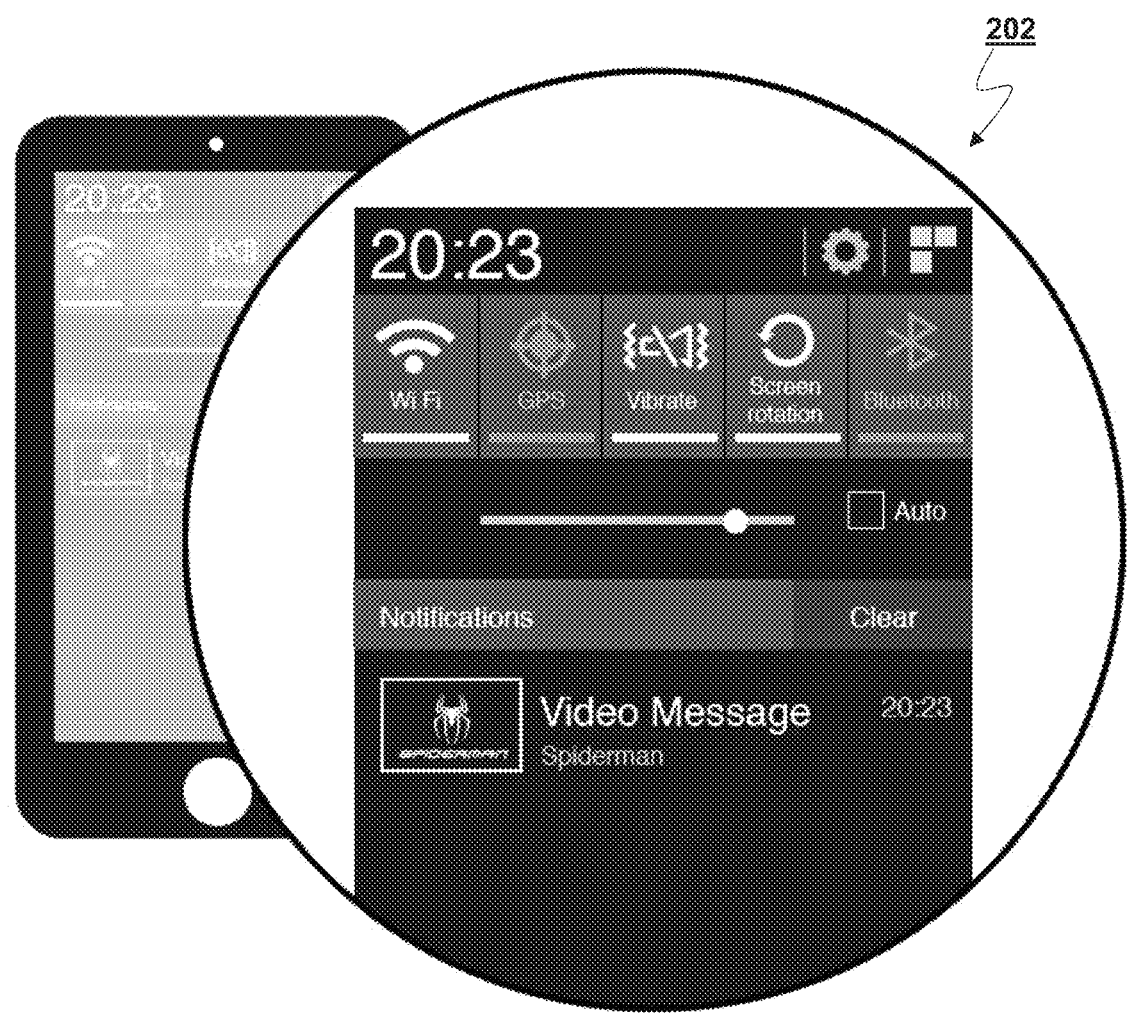
FIG. 4 is an example illustration of the Notification area of the App on a and the new video message including a brief description of the message as obtained from the metafile; selecting the menu item launches the media player and auto-plays the video clip.
Figure 5:
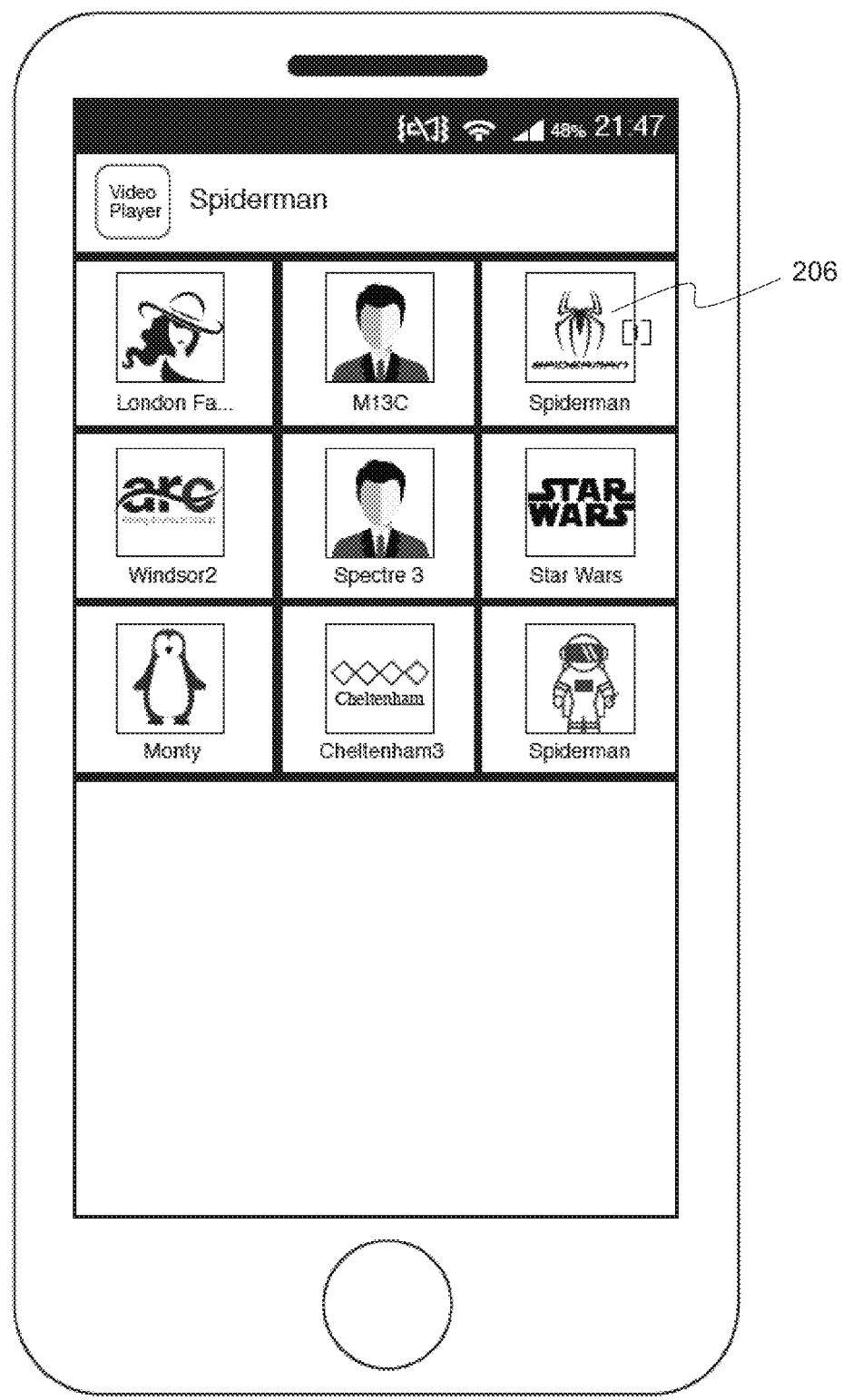
FIG. 5 is an illustration of the video inbox in the App including a plurality of video clips.

Referring now to FIGS. 1 and 2, in one embodiment of the invention, the video messaging system 100 comprises at least one push server 102 configured to utilise a third party messaging service 106, such as, for example, Google Cloud Messaging (GCM), so as to "push" messages to one or more mobile user device(s) 200. The push server 102 is further configured to "supervise" (i.e. control) the connection with the GCM server, maintain and update a user database (e.g. maintain and update user feedback) and also provide a user interface for a controller. Preferably, the push server 102 is connected to the GCM server 106 via high speed Internet connection.

The video messaging system 100 further comprises at least one media server 104 that is operatively coupled to the push server 102 and that is configured to store media files and transmit media files upon receipt of, for example, a message from the GCM server 106. It is understood by the person skilled in the art, that any other trigger may be used to "pull" media files from the media server 104 to one or more mobile user device(s) 200.

The third party messaging service, such as Google Cloud Messaging (GCM) Service, includes a Google-provided connection server 106, a third party App server (not shown) that interacts with the connection server, and a GCM-enabled client App running on a mobile user device 200.

GCM service 106 is made available to third party developers wishing to utilise the GCM service with their own applications. As such, the core GCM software is freely available as an extension for the main Android Software Development Kit (SDK). The GCM service itself is available from Google at no cost and there is no limit to the number of messages that can be sent in any day.

In this example embodiment, the GCM software is integrated into the mobile user device App following a common Java™ programming pattern using "listeners" (event driven function, also referred to as "callbacks" in some other programming languages). It is a highly efficient way for software to handle events such as a GCM message receipt. Instead of constantly having to check for any received message, a notification is triggered only when a message arrives. This notification is registered with the Operating System (OS) and it is not necessary for the application to actually be running in order to receive such notifications.

While utilising GCM with the present invention, the GCM service handles many of the more complicated aspects of sending messages to mobile user devices 200. For instance, by using GCM to message an Android phone with a unique identifier (ID), developers are freed from the problem with having to concern themselves with which network the mobile user device 200 is connected to, and how data can be sent over a particular connection. GCM also offers store-and-forward functionality, so that in case the mobile user device 200 is unreachable for any reason, the message is queued and delivery of the message is automatically re-attempted later.

In addition, there is no explicit involvement of the communication networks required.

The GCM software is currently adapted to work on all Android phones supporting OS2.2 or higher, although for older mobile user devices 200 up to OS3.0 users may need to set up a Google account on their handsets first. From OS4.0.4 onwards, a Google account is not required and GCM will work without any user intervention.

It is understood by the person skilled in the art that, although the described example embodiment utilises the Google Cloud Messaging framework, the video messaging service and system 100 of the present invention may equally be utilised with other Cloud Messaging frameworks.

Video Messaging Service Architecture and Framework

GCM is a convenient message delivery mechanism for 3rd party Android developers. However, the current maximum file (message) size permitted for a GCM "pushed" message is only 4 KB (kilobytes), which is a relatively small amount of data and therefore not large enough for allowing video messaging.

Therefore, the present invention utilises GCM to send a proprietary XML-based metafile, which has a maximum files size that is below the GCM size limit (e.g. 4 KB). This metafile contains, inter alia, the Uniform Resource Locators (URLs) of where all media content (video and any graphics) may be downloaded. The actual media is placed on the media servers 104 at a location pointed to by the URLs in the metafile.

A typical operation of an example embodiment of the present invention (system and method) is now described with particular reference to FIG. 2. The push server 102 initially sends a message to the GCM server 106, where all aspects of delivering a small message to the handset are handled. This includes, for example, queuing and/or storing of the message, in case the mobile user device 200 is offline.

The first time the software application (App) that is installed on the mobile user device 200 is used, a unique identification number (ID) is generated for that particular user and that ID is then registered with the GCM service. The unique identification number (ID) is automatically sent to the push server 102, allowing future identification of the new mobile user device 200.

When an incoming GCM message is received, a GCM Listener framework is called to deliver its small (i.e. max 4 KB) binary payload to the software application. In this particular example, the GCM message payload is interpreted as an XML file (eXtensible Markup Language), which is then sent through a parser (syntax analyser) to extract any specific information required by the software application (App) provided on the mobile user device 200. Amongst the many parameters that may be transmitted in this way, the most crucial ones are the media content file's URL's, providing the App with the address (download link) of the main video file and any other media required by the mobile user device media player.

Upon receiving the XML metafile, the software application (App) generates a list of media elements that are required by the multimedia clip (including button graphics and descriptive texts) to then download each one in turn. The mobile user device 200 remains "silent" whilst the media content is downloaded from the media server 104 as a background process. Once all media items have been downloaded to the mobile user device 200, a user notification is generated and displayed on the mobile user device 200.

In order to verify that data (e.g. main video file) has been transmitted correctly, a file checksum may be included in the media descriptor of the XML file. However, it is understood by the person skilled in the art, that any suitable transmission verification method may be used and applied to any downloaded content. In the event the checksum that is determined by the mobile user device upon reception of the video file does not match the value extracted from the metafile, the download of the video file is reattempted until successfully transmitted to the mobile user device. Further, an alternative download location (alternative URL) may be provided in the metafile and used, in the event the number of failed download attempts exceeds a predetermined number.

During use, the following steps are executed by the media messaging system:
(i) Media content (video, graphics etc.) and the XML metafile(s) are prepared on PC workstations provided in an operations centre;
(ii) The XML metafile(s) are uploaded to the Push Server 102, for example, via an Internet link;
(iii) Media files (referenced by the corresponding XML metafile(s)) are uploaded to Media Server(s) 104, for example, via an Internet link;
(iv) The Push Server 102 then:
   Provides interface with the Google Cloud Messaging Server,
   Maintains a User Database,
   Maintains User Feedback Statistics,
   Provides "Control Panel" for administration,
(v) The Media Server 104 stores the media files;
(vi) Establish a high speed Internet link between the Push Server 102 and the Google Cloud Messaging Server (GCMS) 106. The link allows for the XML metafile to be pushed "downstream" from the Push Server 102 to the GCMS (106), or allow "upstream" messages to be passed from the mobile user device 200 back to the Push Server 102 via the GCMS 106;
(vii) Establish Internet links Over-The-Air (OTA) from the mobile user device 200 to the Push Server 102 using, for example, a HTTP protocol to transmit the following information:
   GCM Registration information,
   User preferences & settings (including channel definitions and selections),
(viii) "Pushing" (OTA) XML metafile from the GCMS 106 to the mobile user device 200 and a reverse "upstream" feedback path from the mobile user device 200 back to the Push Server 102 via the GCMS 106.
(ix) Upon receipt of a message from the GCMS 106, the software application (App), installed on the mobile user device 200, processes the XML metafile and automatically downloads all required media (video file, graphics, images etc.) from the Media Server 104,
(x) Internet (OTA) from the Media Server to the handset—upon receipt of a push message (metafile) via the GCMS 106, the mobile user device 200 "pulls" the required media content from the Media Server 104 "silently", i.e. as a background process.

Receiving and Playing a Video Message on the Mobile User Device

The following processes and user interactions may take place on the mobile user device 200. In this particular example, a dedicated software application (App) has been installed on the mobile user device 200. Reference is made particularly to FIGS. 3 to 7.

Upon receipt of the video message, a message notification may take the form of a standard notification, for example, in the usual Android notifications area 202. The user may then either play the video message directly, e.g. by selecting the icon in the Notifications area, or run the application by selecting a desktop icon and opening the new message from the message inbox 204.

The new video message may include a brief description of the message (information obtained from the corresponding metafile). Selecting the video message in the notification area 202 may launches the media player and auto-plays the video clip 206 directly, i.e. without displaying the video message inbox 204.

In this particular example, the video message inbox 204 is implemented as a directory containing all the media and metafiles needed to play each associates video clip 206. Upon receipt of each list item, the software application (App) queries the corresponding metafile and extracts the following example information:
   The name of the video file,
   The name of the thumbnail image file,
   The video clip title,
   A "flag" (i.e. any suitable indicator) indicating if the message is new (un-played),
   In the event the "new message flag" is set, the background of the video clip icon may be coloured light yellow (or any other suitable colour). The background colour is set back to a default blue-grey (or any other suitable default colour), once the video clip 206 has been played.

The Inbox view may be scrolled up and down in a commonly known way, if the available number of media items does not fit within the available mobile user device window space, and may operate in both portrait and landscape orientations.

When the user presses any item with a "long click" the play of the selected item may start immediately. When the user presses any Inbox item with a "normal click", a menu 208 may be displayed. The menu 208 not only offers the option to play the video clip 206, but may include a variety of other functions associated with the video clip 206.

Figure 6:
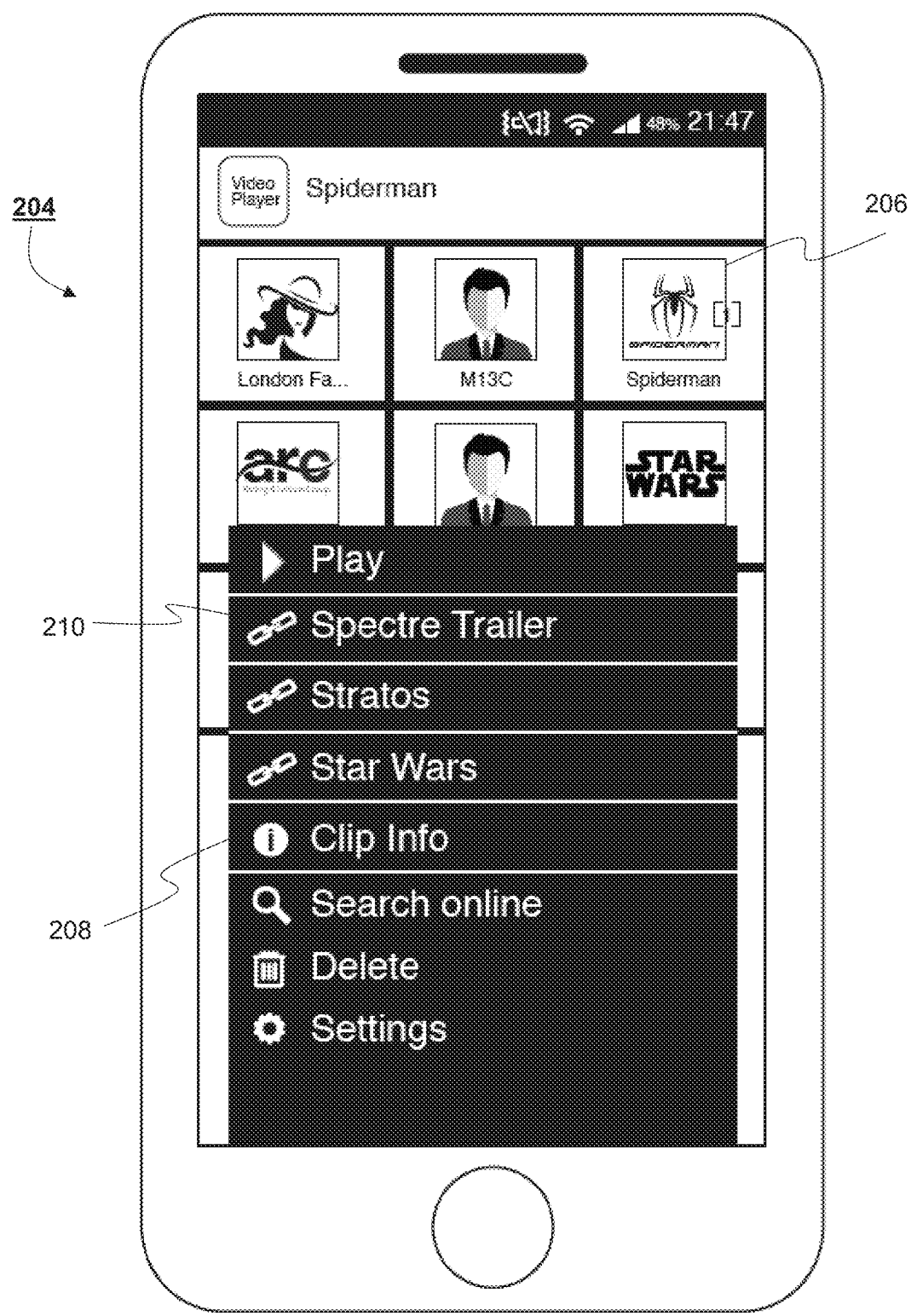
FIG. 6 shows an example illustration of an opened Custom options menu in the video inbox.

The menu 208 shown in FIG. 6 is provided in response to a "normal click" on one of the Inbox items, i.e. video clips 206, and further displays the options available for this particular video clip 206. Some options, such as 'PLAY', 'DELETE' and 'SETTINGS' may be available for all video clips 206. However, other options such as those shown with the 'link' icon 210 may be specially configured for each video clip 206. That is, the menu buttons shown with the 'link' icon 210 may be options that enable a user to interact with the media player in various ways. The 'Clip Info' option may offer the user a brief description of the video clip in a pop-up dialog box along with a small thumbnail image. Selecting 'PLAY' either from the above pop-up menu, or by clicking on the player icon in the Notifications area 202 will activate the media player screen.

Figure 7:
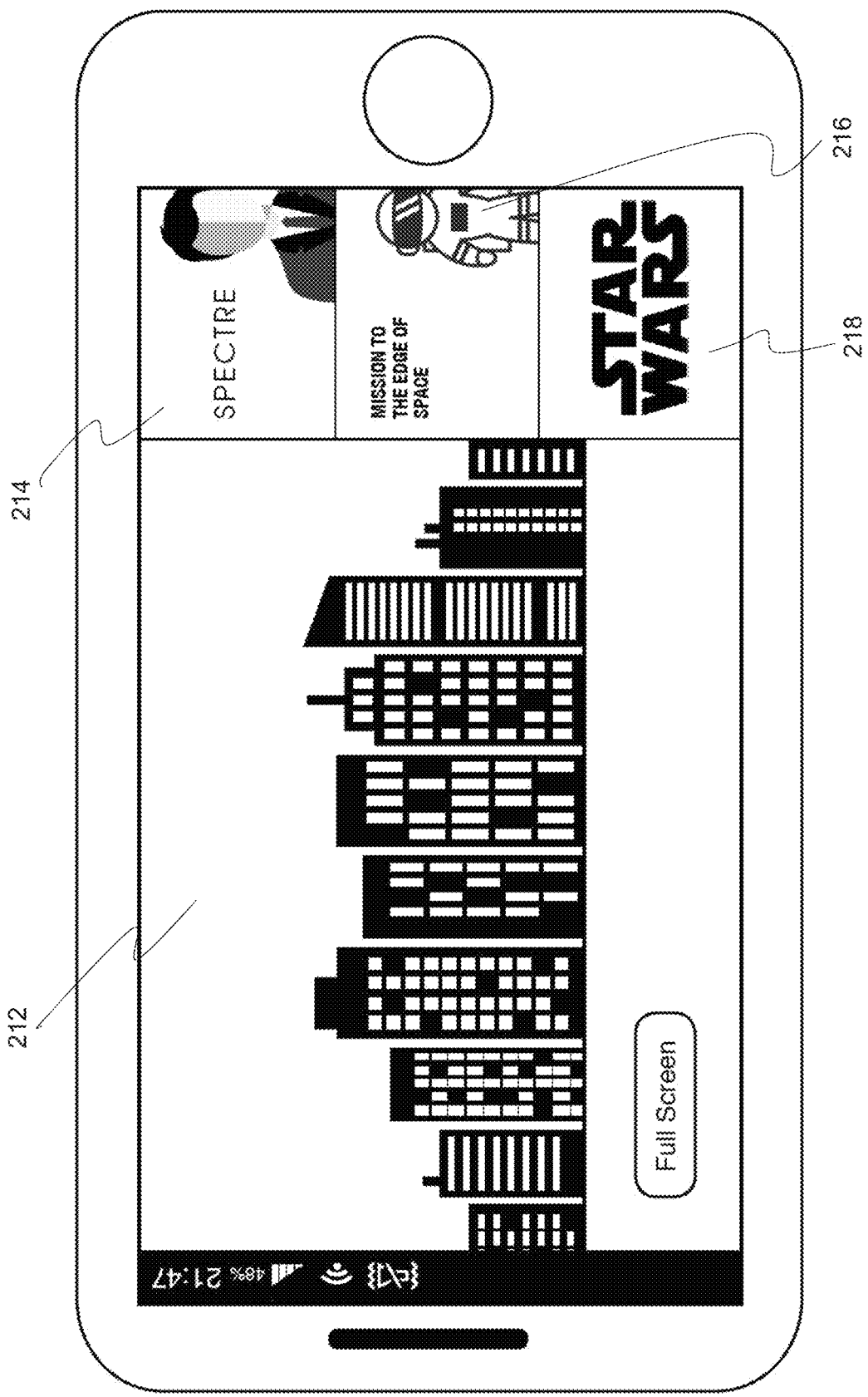
FIG. 7 shows an example illustration of the App interface on a mobile user device when a video is playing, including three on-screen buttons on the right-hand side, functions and graphics of the on-screen buttons are defined in the metafile.

FIG. 7 shows the video playing on the main screen 212, with three on-screen buttons 214, 216, 218 being provided on the right-hand side of the screen. The links and thumbnail graphics for the on-screen buttons 214, 216, 218 are defined in the metafile and may be the same or different to those in the pop-up menu 208. The thumbnail graphic is part of the button definition and is downloaded from the media server 104. Due to physical size limitations on typical mobile user device screens, three or four on-screen buttons 214, 216, 218 may be the practical maximum of buttons, although, there is no fixed limited number within the software application.

One way to increase the number of buttons is by means of a scrollable button area in which many more buttons may be defined and then scrolled-through in a commonly known way.

In addition, the main screen area 212 may be configured "maximise" over the whole screen of the video area by hiding the on-screen buttons 214, 216, 218, or "minimise" in which the video is shown alongside the on-screen buttons 214, 216, 218.

User Settings & Profiling

The software application (App) or media player provided on the mobile user device 200 allows the user to specify any preferences for the type of media content the user may wish to receive. This ensures that the customer (i.e. user) is only sent media content that is wanted and interesting to the user. User preferences provided via the software application or a modified pre-installed media player enables a more specific targeting of advertising, therefore, enhancing advertising opportunities.

The settings & profiling functionality on the media player is broken-down into three sub-categories:
Personal profile settings,
Channel selections, and
Application settings,
wherein, each of the three settings may have its own settings screen.

In particular, the first time the application is used, the profile information is gathered by an auto-running set-up wizard. This profiling process displays two set-up screens corresponding to the personal profile settings and any channel selections. The two screens, as well as, the application settings screen may also be accessed at a later time from the menu system to change any preferences or settings. Subject to a user's consent, the user's profile data may be merged with a base URL provided in the metafile. For example, a re-direction to a music website could define the custom menu web link in the form:
http://www.musicwebsite.com/homepage.html?[age] [musical preferences];
where the parameters provided in brackets are placeholders to indicate a request to the media player to include the 'age' and 'musical preferences' from the user profile in the final URL. However, it is understood by the person skilled in the art that any other parameters may be added or substituted into the query string.

Metafile Format and Specification of Customised Menu & Feedback Options

In addition to the URLs of all media items required for the video message, other information may be provided that enables the media player to provide a variety of additional functions.

For example, the metafile may also include:
the filenames and short descriptions of the video to be played;
URLs of the video, as well as, required graphics and text files;
any definitions of customised menus that can be invoked from either the media player or an App message inbox—this may also include thumbnail graphics for any customised menu buttons;
thumbnail graphics (see FIGS. 5, 6, 7) for icons that are displayed in the application inbox 204 and in the notification area 202;
and optionally:
definition of search terms for the One Click search function;
definition of feedback & reporting data;
timing functions, suitable to notify the user at a particular time;
timing function to auto-delete the message at a specific time;

User Response Mechanisms

Accessing the video messages through a purpose built software application (App) enables useful customisations. One such customisation may be to provide a framework that enables users to quickly and easily respond to, or interact with a received message. In order to achieve this, various user feedback options are specified on a "message-by-message" basis at the authoring stage within the metafile. The software application processes the information in the metafile to display response options according to the selected message.

On a per-message basis, the following custom menu options may be specified:
the label text for the menu option (e.g. 'Order track', 'More on Web' etc.);
the type of feedback response;
Also, the following types of feedback response (e.g. Call-to-Action (CTA) functions) may be supported:
calling a specified number (e.g. a sales line);
sending an auto-generated SMS to a specified number;
launching the browser with a specified URL;
For both SMS and Browse-to-URL options, additional data extracted from the metafile may be included to assist video clip identification and tracking. Also, for both SMS and Browse-to-URL options, data from the user's profile (subject to permissions being obtained) can be merged or appended to the "base data" specified in the XML metafile. This, for example, could allow the owner of a website being accessed from the application to know something about their visitors.

In the case of SMS feedback, this data is auto-included in the SMS text body, for the Browse-to-URL option, the same information can be sent to the media server 104 as a query string.

Therefore, the Browse-to-URL functionality may provide:
the ability to specify the URL of a push server 102 with information within the query string to identify another video clip—the Browse-to-URL option can therefore be used to request another video clip from the media server 104;
The ability to link the user a "buy now" web page specific to the content being viewed;
the ability to link with a search engine with pre-defined search terms (within the metafile) relevant to the video clip being viewed—this functionality may result in a "one-click" search function without any need for user input (e.g. type in a search keyword);
the ability to specify the URL of a push server 102 with information within the query string to identify another video clip, the Browse-to-URL option can therefore be used to request another video clip from the media server 104.

Data Capture

The software application of the present invention may be used to collect user data in response to distributed messages in two ways.

(1) By means of an automatically-generated message that is sent back to the push server 102 via the GCM service 106. This message can be sent automatically when 'PLAY' of the video is stopped or has come to an end. This mode may be called "Auto Reporting" as it does not depend on any user explicit action or intervention.

(2) Data may also be collected by a web server when a browser is launched from an end-of-play button or from the main pop-up menu. In this case, the user may make a conscious decision to press a feedback button and visit a specific web site.

Data that may be collected includes the following:

If video has been viewed;
If video has been viewed to the end;
Number of times the video has been viewed;
Clip ID (assigned by the Push Server 102);
IMEI number of the mobile user device;
Android ID Number of the mobile user device;
Model of the mobile user device;
Communication Network;
Mobile user device language setting;
Any search terms associated with the video clip (this is especially useful for Web feedback when the receiving server is a search engine);
Any ID of selected on-screen button(s)—Web feedback only;
Text of any selected on-screen button—Web feedback only;

If the user has set the personal preferences (and subject to privacy issues), the following parameters may also be gathered:

List of channel selections;
Gender of the user;
Date of birth of the user;
Other parameters provided in the personal preferences section;

In this particular example, it is understood that the Android ID here is the ID returned by the Operating System (OS) and is not the same number assigned by the GCM service.

In summary, the method (software app) of the example embodiment of the present invention is capable of delivering good quality video messages of several minutes play length. The messages themselves may be delivered at no cost and do not require the explicit involvement or participation of the Network Operator. The user can specify personal preferences to help the service operator to deliver media content which can be more accurately tailored to appeal to individual tastes of the user. Importantly, the present invention allows various ways a user can respond to, or interact with a received video message. This interaction can, for example, take the form of directing the user to a specific web site to download or view more related media content, to search for additional related information, or a single-press "Call to Action" (CTA) for e-commerce applications. The details of any user response option are highly flexible and may be defined on a message by message basis at the clip authoring stage. Furthermore, the present invention provides means of gathering detailed usage information, further enhancing value to advertisers. For example, in an advertiser-driven revenue model, advertisements may be combined with the video feature. These can be in the form of short video advertisements at the start and/or at the end of the main feature, a static graphic displayed after the end of play, and the use of custom menu options linking to an advertiser's web site.

Also, the ability to request another video clip from the media server 104 enables a much longer video to be divided into a suitbale number of smaller clips, and to be sent as separate "episodes". For each episode in the series, there may be three or more on-screen option buttons to allow both (i) request the next episode(s) in the series and (ii) to provide HTML link(s) to other content that is related to either that particular previous episode or the series of episodes in general. The on-screen button that provides the function of requesting the next episode may also be labelled with the current running time and/or episode number (e.g. obtained from the XML metafile), and which can be requested while the current clip is playing. Alternatively, the next episode in the sequence may be requested automatically after a predetermined percentage (for example 50% of the total running time) of the current episode has been viewed.

Inbox Display Options

In relation to the information contained in the metafile, it is possible to tag each video clip 206 to allow for various display options within the Inbox 204.

For example, tags may be added to allow filtering so that users can choose to display only video clips 206 of a particular category.

Alternatively, video clips 206 may be displayed or sorted alphabetically, or may be displayed according to a specific search term. For example, a video clip 206 may be sent as a plurality of parts or "episodes" of a sequence and video clips 206 within the sequence may be tagged in such a way that the Inbox 204 aggregates all constituent parts displaying the series of video clips 206 as a single item within the Inbox 204.

Peer-Peer Message Forwarding

Instead of only using the video messaging service and system of the present invention as a pure server-to-client service, i.e. services are provided directly to the end user, an embodiment of the present invention may be used for peer-to-peer service between end users, i.e. video messages may be forwarded or sent from one end user to another utilising the messaging service of the present invention.

Following is a first example describing the use of the present invention for peer-to-peer messaging (step-by-step) via forwarding.

(1) When the software application (App), installed on the mobile user device 200, is actuated for the first time, a unique GCM-assigned number (ID) is logged in a client database. Along with this information, additional information allowing the user to be identified (such as phone number and/or email address) may be logged together with this unique user ID. The additional contact information (phone number, email address) will enable a first user that is in possession of the contact information of a second user to forward a media message (e.g. originally sent to them from the media server 104) to the second user (e.g. a friend or other contact).

(2) In order to forward a video message from the mobile user device 200, a special HTTP request may be sent to the media server 104 indicating (i) the video clip 206 to be forwarded, (ii) who (i.e. other user, ID) is sending the video clip 206 and (iii) who is the recipient (as specified by their phone number or email).

(3) Upon receipt of this HTTP request, the media server 104 determines the associated GCM network ID from the supplied recipient phone number or email, and generates a request to send the specified video clip 206 to the specified mobile user device 200. Thus, the process of forwarding a video clip 206 from one user to another is in effect the same as sending a request to the central server to send a specified video clip 206 directly from the media server 104 to the specified mobile user device 200.

(4) In the event of the specified phone number or email is not associated with an existing GCM user ID (or is not found in the database), which would be the case if the recipient did not yet have a suitable software application or App installed on the mobile user device 200, a text message or email may be auto-generated and sent to the specified recipient, including a link to download and install the required software application or App.

Following is a second example describing the use of the present invention for peer-to-peer messaging (step-by-step) of user-generated media content.

An embodiment of the present invention may also be used to send user-generated media content, such as photos or videos taken on the user's own mobile device 200, to another user. The steps required are similar to the steps for forwarding messages from one user to another. Particular variations are that the user is required to first upload the user-generated media content to the central media server 104, before a "request to send" is generated on the central media server 104. The sequence of events may be scheduled automatically together with the auto-generation and upload of the XML instructions file (i.e. metafile associated with the media content and pushed via push server 102).

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A method for providing a video messaging service to one or more mobile user device(s) in a wireless telecommunication network, comprising the steps of:
    (a) receiving and storing, at a predetermined media storage, at least one media content file;
    (b) generating at least one metafile associated with the at least one media content file, the metafile being provided in Extensible Markup Language (XML) format at a file size that is less than or equal to a predetermined file size limit, and comprising at least
       (i) a first Uniform Resource Locator (URL) of the at least one media content file,
       (ii) one or more first autonomously actionable instructions, adapted to effect transfer of the at least one media content file from the predetermined media storage to the one or more mobile user device(s), and
       (iii) one or more second autonomously actionable instructions, adapted to effect creation of a dynamically adaptable media player interface, or one or more third autonomously actionable instructions, adapted to dynamically modify one or more interface characteristics of a media player application provided on said one or more mobile device(s);
    (c) transmitting, via push technology, at least one metafile to the one or more mobile user device(s), utilising a third party messaging service;
    (d) responsive to the one or more first autonomously actionable instructions, downloading, via pull technology, the at least one media content file from the predetermined media storage to the one or more mobile user device(s), utilising said wireless telecommunication network subject to a predetermined first condition;
    (e) responsive to completing the download of the at least one media content file, notifying availability of the at least one media content file at the one or more mobile user device, and
    (f) responsive to a predetermined user input, accessing the at least one media content file utilising a media player application provided on the one or more mobile user device(s).

2. The method according to claim 1, wherein steps (a), (b), (c), (d), (e) and (f) are executed in a sequential order.

3. The method according to claim 1, wherein the at least one media content file comprises any one of at least one video file, one or more Graphical User Interface (GUI) element(s), and one or more CTA (Call To Action) functionality element(s) adapted to link to and/or launch external media content.

4. The method according to claim 3, wherein any one of the at least one video file, the one or more Graphical User Interface (GUI) element(s), and the one or more CTA functionality element(s) are selected according to profile data provided by the user, the profile data comprising one or more user profile parameter(s).

5. The method according to claim 4, wherein the profile data comprises predetermined user profile information and/or predetermined user preferences.

6. The method according to claim 4, wherein the at least one media content file further comprises at least one second URL operably linked with the one or more CTA functionality element(s).

7. The method according to claim 6, wherein the at least one second URL comprises a query string generated from the one or more user profile parameter(s).

8. The method according to claim 6, wherein any one of steps (d), (e) and (f) further comprise the step of generating feedback data and transmitting, via push technology, the feedback data utilising the third party messaging service.

9. The method according to claim 8, wherein the feedback data is transmitted, via push technology, utilising the third party messaging service and/or a Hypertext Transfer Protocol (HTTP).

10. The method according to claim 8, wherein the feedback data comprises user behaviour detected in regard to interacting with the media player application and/or the at least one media content file.

11. The method according to claim 8, wherein the feedback data is operably linked to the one or more CTA functionality element(s).

12. The method according to claim 1, wherein the at least one metafile further comprises metadata associated with the at least one media content file.

13. The method according to claim 1, wherein the file size limit is four kilobytes (kB).

14. The method according to claim 1, wherein the predetermined first condition is that the wireless telecommunication network is one or more of: not a cellular telephone network; or a wireless local area network (WiFi).

15. The method according to claim 1, wherein step (d) further includes the step of determining an integrity characteristic of the downloaded at least one media content file and, subject to at least one second condition, repeat the step of downloading, via pull technology, the at least one media content file from the predetermined media storage to the one or more mobile user device(s).

16. The method according to claim 15, wherein the at least one second condition is that the determined integrity characteristic of the downloaded at least one media content file matches a threshold value provided in the at least one metafile.

17. The method according to claim 15, wherein the integrity characteristic of the at least one media content file is determined utilising a checksum function.

18. The method according to claim 1, wherein the third party messaging service is a cloud based messaging service.

19. The method according to claim 1, wherein step (d) further includes the step of dividing the media content file into a predetermined number of separate media content file portions so as to form a sequence of the media content file.

20. A video messaging system comprising:
   a software application;
   at least one mobile user device for operating the software application;
   a media storage and delivery platform;
   a wireless telecommunication network;
   at least one third party messaging service platform; and
   wherein the video messaging system is adapted to perform operations comprising:
   (a) receiving and storing, at a predetermined media storage, at least one media content file;
   (b) generating at least one metafile associated with the at least one media content file, the metafile being provided in Extensible Markup Language (XML) format at a file size that is less than or equal to a predetermined file size limit, and comprising at least
      (i) a first Uniform Resource Locator (URL) of the at least one media content file,
      (ii) one or more first autonomously actionable instructions, adapted to effect transfer of the at least one media content file from the predetermined media storage to the at least one mobile device, and
      (iii) one or more second autonomously actionable instructions, adapted to effect creation of a dynamically adaptable media player interface, or one or more third autonomously actionable instructions, adapted to dynamically modify one or more interface characteristics of a media player application provided on said at least one mobile device;
   (c) transmitting, via push technology, at least one metafile to the at least one mobile device, utilising the at least one third party messaging platform;
   (d) responsive to the one or more first autonomously actionable instructions, downloading, via pull technology, the at least one media content file from the predetermined media storage to the at least one mobile device, utilising said wireless telecommunication network subject to a predetermined first condition;
   (e) responsive to completing the download of the at least one media content file, notifying availability of the at least one media content file at the at least one mobile user device, and
   (f) responsive to a predetermined user input, accessing the at least one media content file utilising a media player application provided on the at least one mobile user device.

\* \* \* \* \*